UNITED STATES PATENT OFFICE.

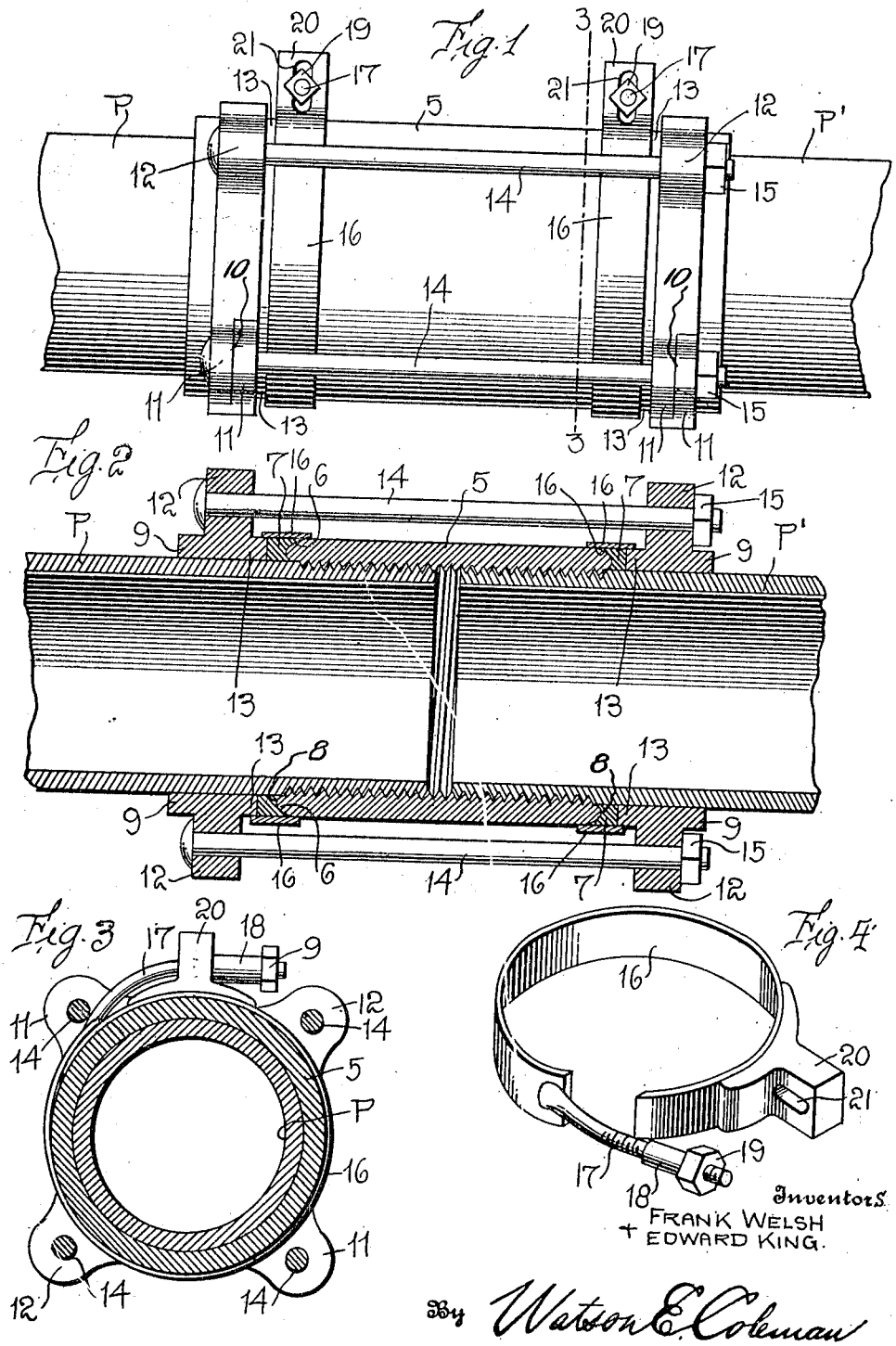

EDWARD KING AND FRANK WELSH, OF GRANVILLE, OHIO.

PIPE-COUPLING.

1,270,300.   Specification of Letters Patent.   Patented June 25, 1918.

Application filed April 9, 1917.   Serial No. 160,729.

*To all whom it may concern:*

Be it known that we, EDWARD KING and FRANK WELSH, citizens of the United States, residing at Granville, in the county of Licking and State of Ohio, have invented certain new and useful Improvements in Pipe-Couplings, of which the following is a specification, reference being had to the accompanying drawings.

This invention relates to an improved pipe coupling and has for its primary object to provide simple, effective, and easily applied means for obtaining an absolutely fluid-tight joint or connection between pipe sections.

It is a more particular object of the invention to provide a device for the above purpose embodying an interiorly threaded coupling sleeve for engagement on the ends of the pipe sections, gaskets to be disposed against the end of the sleeve, and means for producing an axially and radially compressing pressure upon the gaskets.

It is also an additional object of our invention to provide a device for the above purpose, which consists of relatively few parts capable of easy and quick adjustment and which will maintain their adjusted positions, the device as a whole being efficient and reliable in practical use and capable of manufacture at relatively small cost.

With the above and other objects in view, our invention consists in the novel features of construction, combination, and arrangement of parts to be hereinafter more fully described, claimed, and illustrated in the accompanying drawing, in which, Figure 1 is a side elevation of our improved pipe coupling;

Fig. 2 is a longitudinal section;

Fig. 3 is a transverse section taken on the line 3—3 of Fig. 1; and

Fig. 4 is a detail perspective view of one of the gasket compressing bands.

Referring in detail to the drawing, P and P′ designate the two pipe sections which are to be coupled together. These pipe sections on their opposed ends are exteriorly threaded to receive an interiorly threaded, metal coupling sleeve 5. The opposite end edges of this sleeve are of rounded or convex form, as shown at 6.

Against the opposite ends of the sleeve 5, the compressible, annular gaskets 7 of rubber or other suitable material, are arranged in circumscribing relation to the respective pipe sections P and P′. These gaskets are preferably split to facilitate their application to the pipe sections, and provided with the concave edges 8 for close fitting engagement upon the convex end edges 6 of the sleeve 5.

For the purpose of compressing the gaskets in an axial direction, we provide the metal collars, each of which consists of a pair of semi-circular castings 9, the ends of which are reduced in thickness for lapping engagement, as at 10. These lapped ends of the collar castings are formed with apertured ears 11, and a similar ear 12 is also formed intermediate the ends of each collar section. The sections 9 of each collar are provided upon one face with laterally projecting flanges 13, and the flanges of each section of the collar are adapted for engagement against the outer edges of one of the gaskets 7. The spaced collars are connected by the longitudinally disposed bolts 14, the ends of which are engaged through the coinciding apertured lugs on the collars. Suitable nuts 15 are threaded upon these bolts, whereby the collars may be forced toward each other and against the compressible gasket 7.

16 designates the split, resilient metal, clamping band preferably of steel, each of which is provided upon one end with a curved, longitudinally extending rod 17, upon which a metal sleeve 18 is engaged. The terminal of the rod 17 is threaded to receive a nut 19. Upon the band 16 in spaced relation to its other end, a rectangular lug or casting 20 is securely riveted or otherwise fixed, and is provided with an elongated slot 21 through which the rod 17 is loosely engaged.

The bands 16 are to be engaged around and upon the gaskets 7 and are of appreciably greater width than said gaskets so that they will lap upon the coupling sleeve 5 and the flanges 13 of the clamping collars. The threaded rod 17 being engaged through the slotted lugs 20, upon adjusting the nuts 19 inwardly against the ends of the metal sleeves 18, it will be understood that the bands are contracted upon the periphery of the gaskets 7, thereby compressing said gaskets radially. The nuts 15 are then further tightened to exert an axially expressing action of the gaskets, forcing the same inwardly upon the convex end 6 of the sleeve 5. This axial compression will tend to expand the gaskets radially and cause the same to exert an outward pressure against the inner faces of the bands 16. These counteracting compressing pressures on the gaskets produce an absolutely water-tight joint between the ends of the sleeve 5 and the respective pipe sections, so that the escape of water or other fluid from the pipe sections is precluded.

From the foregoing description, taken in connection with the accompanying drawing, the construction, manner of operation, and several advantages of our invention will be clearly and fully understood. It will be appreciated that the several parts of the device can be easily and quickly applied in their operative positions and readily adjusted so as to obtain the desired pressure upon the compressible gaskets. Metal sleeves 18 of various lengths may be employed so as to obtain the requisite contraction of the band 16 upon the gaskets 7. The elements employed are all of very simple form and it will, therefore, be appreciated that the device as a whole can be produced at small manufacturing cost, and we have also found our invention to be highly reliable and serviceable in practical use.

While we have herein shown and described the preferred construction and arrangement of the several parts employed, it is to be understood that the device is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:

The herein described pipe coupling including a sleeve adapted to be connected to the ends of the pipe sections, compressible gaskets for engagement against the ends of the sleeve and of a normal diameter corresponding to the diameter of the sleeve, collars engaged upon the respective pipe sections each having an annular shoulder on one of its side faces to engage one of the gaskets, adjustable means connecting the collars to cause the same to exert an axial compressing pressure against the respective gaskets, and a contractile metal band engaged upon each gasket and overlapping upon the end of the sleeve and upon the shoulder of the adjacent collar.

In testimony whereof we hereunto affix our signatures in the presence of two witnesses.

EDWARD KING.
FRANK WELSH.

Witnesses:
JOHN A. OWENS,
HERBERT WILLIAMS.

Copies of this patent may be obtained for five cents each, by addressing the "Commissioner of Patents, Washington, D. C."